United States Patent [19]

Severus et al.

[11] 4,177,299

[45] Dec. 4, 1979

[54] ALUMINUM OR ALUMINUM ALLOY ARTICLE AND PROCESS

[75] Inventors: Harald Severus, Schaffhausen; Horst Birkmaier, Neuhausen am Rheinfall, both of Switzerland

[73] Assignee: Swiss Aluminium Ltd., Chippis, Switzerland

[21] Appl. No.: 923,825

[22] Filed: Jul. 12, 1978

Related U.S. Application Data

[63] Continuation-in-part of Ser. No. 872,751, Jan. 27, 1978, abandoned.

[51] Int. Cl.[2] .......................... B32B 15/20; C23F 5/04

[52] U.S. Cl. ..................................... 427/287; 148/6.1; 148/31.5; 148/11.5 A; 8/2.5 A; 101/470; 428/469; 427/380; 427/372 R; 427/388 R; 204/58; 204/38 A; 204/35 N

[58] Field of Search .................... 148/31.5, 2, 159, 6.1, 148/6.3, 6.27, 469, 472, 11.5 A, 12.7 A; 428/469; 427/388 R, 372 R, 380, 287; 204/58, 38 A, 35 N; 101/470; 8/2.5 R, 2.5 A

[56] References Cited

U.S. PATENT DOCUMENTS

| | | | |
|---|---|---|---|
| Re. 25,566 | 4/1964 | Deal et al. | 204/58 |
| 1,869,041 | 7/1932 | Bengston | 148/31.5 |
| 2,836,526 | 5/1958 | Marosi | 148/31.5 |
| 2,859,147 | 11/1958 | Jeremias | 148/31.5 |
| 3,164,494 | 1/1965 | English | 148/31.5 |
| 3,202,550 | 8/1965 | Grossmann et al. | 148/31.5 |
| 3,227,639 | 1/1966 | Kampert | 204/58 |
| 3,242,037 | 3/1966 | Howe | 161/218 |
| 3,258,381 | 6/1966 | Howe et al. | 156/240 |
| 3,264,158 | 8/1966 | Howe | 156/230 |
| 3,326,728 | 6/1967 | Robinson | 148/31.5 |
| 3,423,298 | 1/1969 | Michelson et al. | 204/58 |
| 3,484,342 | 12/1969 | Blake et al. | 204/18 |
| 3,551,303 | 12/1970 | Suzulu et al. | 204/35 N |
| 3,616,309 | 10/1971 | Azoda et al. | 204/58 |
| 3,647,503 | 3/1972 | Mizutani et al. | 428/305 |
| 3,734,784 | 5/1973 | Bercday | 148/31.5 |
| 3,772,166 | 11/1973 | Woods | 204/58 |
| 3,827,952 | 8/1974 | Franz | 148/31.5 |
| 3,945,899 | 3/1976 | Nikaido et al. | 148/31.5 |
| 4,039,355 | 8/1977 | Takashi et al. | 148/31.5 |
| 4,098,619 | 4/1978 | Franz | 204/58 |

OTHER PUBLICATIONS

Wernick, S., et al., *The Surface Treatment and Finishing of Aluminum and Its Alloys;* 3rd Edition; Robert Draper, Ltd., Teddington, pp. 337-342 (1964).

*Primary Examiner*—L. Dewayne Rutledge
*Assistant Examiner*—Michael L. Lewis
*Attorney, Agent, or Firm*—Bachman and LaPointe

[57] ABSTRACT

An object is made out of aluminum or aluminum alloy in a form such as foil, sheet, containers and the like and has a 5 to 25 μm thick oxide layer produced by anodic oxidation. This oxide layer exhibits a crack-free elongation of at least 0.65 parts per thousand in the non-sealed condition and the ratio of the crack-free elongation of the oxide in the non-sealed condition to that in the colored, non-sealed condition lies between 1:1.2 and 1:5.5. Such an object can then be colored by heat-transfer printing without producing hair-line cracks in the oxide layer, which would give the image so produced an unattractive appearance.

14 Claims, No Drawings

ALUMINUM OR ALUMINUM ALLOY ARTICLE AND PROCESS

CROSS REFERENCE TO RELATED APPLICATION

This application is a Continuation-In-Part of copending application Ser. No. 872,751 for Object Made of Aluminum or Aluminum Alloy, By Severus and Birkmaier, Filed Jan. 27, 1978, now abandoned.

BACKGROUND OF THE INVENTION

The invention concerns an object made of aluminum or aluminum alloys in a form such as sheet, foil, containers and the like and having an anodically oxidized surface layer. The said object is suitable for use in printing by means of sublimation thermal printing.

Aluminum and aluminum based alloys in the form of finished or semi-finished products, which are expected to exhibit good corrosion resistance and wear resistance as well as having an attractive, decorative appearance, are usually given an anodic oxidation treatment.

An oxide layer is formed in electrolytes which are generally made up of dilute sulphuric acid, sometimes with additions of oxalic acid, less often of dilute oxalic acid alone, or of dilute phosphoric or chromic acid, and by applying an electrical current, principally in the form of direct current, less often in the form of alternating current or by superimposing or switching alternating and direct current, the items or semi-fabricated product being made the anode in the circuit.

These oxide layers are in general made up of a very thin, almost pore-free dielectric base layer, the so called barrier layer, and on top of this a top layer which has many fine pores in it. The barrier layer is self-generating, being formed by the conversion of aluminum to aluminum oxide and this at the same rate as the top layer is formed during anodic oxidation.

The top layer is made up of bundles of fibers which lie essentially perpendicular to the surface of the metal and in general are transparent and colorless when produced using dilute sulphuric acid as the electrolyte and direct current.

There are many processes which can be used to produce color effects in the anodic oxide layer on aluminum. These processes can be divided into four groups according to the way they work:

(1) Color can be introduced by using special electrolytes, e.g., aqueous solutions of carbonic acid or sulphonic acid.

(2) Deposition of metals in the pores in the fiber bundle of the top layer of a transparent, colorless oxide layer, by means of an alternating current applied in an aqueous metal salt solution.

(3) Deposition of inorganic pigments or organic coloring agents in the pores in the fiber bundle of the top layer of a transparent, colorless anodic layer by means of immersion in a warm solution containing the coloring substance.

(4) Deposition of organic coloring agents in the pores in the fiber bundle making up the top layer of a transparent, colorless oxide layer by bringing the oxide into direct contact with a hydrolysis-resistant, coloring agent which can sublimate and which is printed on a substrate, e.g., a paper substrate, with the result that the anodic oxide layer sucks up the coloring agent into the pores in the fiber bundle under the influence of heat. The coloring agents which are suitable for this process are dispersion coloring substances with anthrachinon as the basis with at least one of the positions 1, 4, 5 or 8 occupied by either H, OH—, amino or amido groups and at least one active hydrogen, or azo coloring agents with an OH— group in the ortho position of the azo group, or coloring agents with a 1,3-indandion group.

After the coloring substance has been deposited in the oxide, the pores in the anodic oxide layer containing the coloring substance are closed or sealed, as by a treatment in hot, deionized water. As a result of the hot water treatment, at least a part of the $Al_2O_3$ of the newly produced oxide layer is converted to AlOOH, so called pseudo-boehmite.

On looking at the four different processes for coloring anodic oxide layers on aluminum, it is clear that anodic oxide layers which are multi-colored, patterned or carrying a picture can be produced commercially in a particularly favorable manner by the process listed under point (4), viz., using the transfer of coloring material which can be sublimated from a paper substrate under the influence of contact pressure and heat by so called heat-transfer printing.

This process which has been known for some time now has not been able to develop into a usable technology as it suffered from the serious disadvantage that on transferring the hydrolysis-resistant, sublimable organic coloring substance from the substrate to the absorbant 5 to 20 μm thick anodic oxide layer by heating to the temperature of 120° to 220° C. necessary for that process, fine hair-line cracks occured and these were disturbing to the eye especially when viewed at acute angles of incident light.

The object of the present invention, therefore, is to develop an object made of aluminum or aluminum alloys which has an oxide produced by anodic oxidation which can be given a colored image using sublimable, hydrolysis-resistant coloring substances by means of heat-transfer printing without the oxide layer afterwards exhibiting disturbing hair-line cracks due to the effect of the temperature required for the sublimation process.

SUMMARY OF THE INVENTION

It has been found in accordance with the present invention that the foregoing objects are fulfilled in that the oxide layer is 5 to 25 μm thick, exhibits a crack-free elongation of at least 0.65% o (parts per thousand) in the non-sealed condition and the ratio of crack-free elongation of the oxide layer in the non-sealed condition to crack-free elongation in the colored and non-sealed condition lies between 1:1.2 to 1:5.5.

The thickness of the anodic oxide layer is preferably between 10 and 22 μm, the crack-free elongation in non-colored, non-sealed condition between 0.7 and 4 parts per thousand and the ratio of the crack-free elongation in the non-colored, non-sealed condition to the colored, non-sealed condition between 1:1.7 to 1:5.

In addition to the foregoing, the present invention resides in a thermal transfer printing process for coloring on aluminum or aluminum alloys including the step of applying thermal transfer printing methods to shaped aluminum or aluminum alloy articles having an oxide layer as defined hereinabove.

DETAILED DESCRIPTION

Extensive trials have shown that, when the normal coloring substances are used, e.g., anthrachinon based, azo-coloring substances with an indandion group, the crack-free elongation of the colored, non-sealed oxide layer is principally determined by the anodizing conditions and the alloy employed, i.e., it is to a large extent independent of the kind of coloring substance. It was also found that the crack-free elongation of the colored, non-sealed oxide layer lies between 3.4 and 6 parts per thousand and cannot be represented as a function of the crack-free elongation of the oxide layer in the non-colored condition. It thus represents a characteristic property of oxide layers which have been produced by anodic oxidation.

In the final colored and sealed condition, anodic oxide layers exhibit a crack-free elongation of 3.3 to 5 parts per thousand. It was evident from this that the elongation of the layers was in most cases reduced by an amount up to 0.6 parts per thousand by the sealing operation. The wear resistance and the hardness, determined by the abrasimeter test according to Haueisen, were not related to the oxide layer properties required in accordance with the invention. In the case of oxide layers produced in the same electrolyte by the same kind of electrical current (direct current, alternating current, etc.) no difference could be found in wear resistance, independent of whether hair-line cracks were produced in the oxide layer by heat-transfer printing or not.

The properties of the absorbant oxide layer required by the process of the present invention are obtained by controlled interaction of the following parameters:

(a) alloy composition and condition of the product or semi-finished product to be anodized, in particular sheet and extruded section;
(b) composition and concentration of the electrolyte;
(c) electrolyte temperature; and
(d) current density.

Oxide layers which have been found to be particularly suitable are those on AlMg alloys containing 0.5 to 4% magnesium, preferably 1 to 3% magnesium. These alloys are used preferably in the half-hard condition, as specified by the German specification DIN 17007 sheet 4 (corresponding to the H-14 temper), in the rolled or recovered condition.

The invention will now be described in greater detail with the help of two examples.

EXAMPLE I

A 19 $\mu$m thick oxide layer which was produced on a half-hard, rolled, 0.8 mm thick sheet of the Aluminum Alloy AlMg 1.5 (anodizing grade—Aluminum Alloy 5050) exhibited a crack-free elongation of 0.8 parts per thousand in the non-sealed condition. This material was obtained by anodic oxidation for a period of 45 minutes with a current density of 1.3 A/dm$^2$. The voltage was 14 V and the temperature of the electrolyte was 23° C. The electrolyte contained 196 g. $H_2SO_4$ per liter and the aluminum content was 11 grams per liter.

A substrate was provided made of paper suitable for low pressure printing containing various hydrolysis-resistant, sublimable dispersion coloring substances such as are used in the low pressure printing process in the form of a mirror image pattern. The substrate was then laid on the anodic oxide layer of the aforesaid AlMg sheet and held for 1 minute under a pressure of 0.1 kp/cm$^2$ at a temperature of 180° C.,during which time the colored image was transferred to the anodic oxide layer which then bore the colored image in the correct, reversed manner. There were no hair-line cracks in the anodic oxide layer which exhibited a crack-free elongation of 3.7 parts per thousand in this colored, non-sealed condition. The ratio of crack-free elongation in the non-colored condition to that in the colored condition was then 1:4.6.

Next, the colored anodic oxide layer was sealed by immersion for 45 minutes in a bath of deionized, boiling water containing additions of commercially available sealing salts, i.e., the pores of the anodic oxide layer which now contained the hydrolysis-resistant, sublimable coloring substance at their base were closed by forming aluminum hydrates.

After this sealing treatment the anodic oxide layer exhibited a crack-free elongation of 3.5 parts per thousand and a Haueisen abrasion hardness of 8.3 seconds per $\mu$m of oxide layer thickness.

EXAMPLE II

In contrast to Example I the behavior of an oxide layer which is unsuitable for heat-transfer printing will be illustrated here.

A 19 $\mu$m thick oxide layer was produced on a sheet of the same type as used in Example I and in the non-sealed, non-colored condition exhibited a crack-free elongation of 0.63 parts per thousand. This material was obtained by anodic oxidation for a period of 45 minutes with a current density of 1.5 A/dm$^2$. The voltage was 16 V and the temperature of the electrolyte was 18° C. The electrolyte contained 196 g. $H_2SO_4$ per liter, and the aluminum content was 11 grams per liter.

A substrate was provided made of a paper suitable for low pressure printing containing various hydrolysis-resistant, sublimable dispersion coloring substances such as are used in the low pressure printing process in the form of a mirror image pattern. The substrate was then laid on the anodic oxide layer and held for 1 minute under a pressure of 0.1 kp/cm$^2$ at a temperature of 180° C. during which time the colored image was transferred to the anodic oxide layer which then bore the colored image in the correct, reversed manner. The anodic oxide layer exhibited fine hair-line cracks which were very disturbing to the eye when the image is viewed with the naked eye at an acute angle to the horizontal. The crack-free elongation of this oxide layer in the colored, non-sealed condition was 3.7 parts per thousand and the ratio of crack-free elongation in the non-colored, non-sealed condition to the colored, non-sealed condition was 1:5.9.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An object made out of aluminum or aluminun alloys in a form such as foil, sheet and containers for use in preparing colored articles by a thermal transfer printing process, said object having an oxide layer produced by anodic oxidation wherein the oxide layer is 5 to 25 $\mu$m thick, exhibits a crack-free elongation of at least 0.65 parts per thousand in the non-sealed condition and the ratio of crack-free elongation of the oxide in the non-sealed condition to the crack-free elongation in the colored and non-sealed condition lies between 1:1.2 and 1:5.5.

2. An object according to claim 1 in which the thickness of the oxide layer is 10 to 22 μm.

3. An object according to claim 1 in which the crack-free elongation of the oxide layer in the newly produced, non-sealed condition lies between 0.7 and 4 parts per thousand.

4. An object according to claim 1 in which the ratio of the crack-free elongation of the oxide layer in the non-colored, non-sealed condition to that of the colored, non-sealed condition lies between 1:1.7 and 1:5.

5. An object according to claim 1 in which the oxide layer was produced on an AlMg alloy in which the magnesium content of the alloy lies between 0.5 and 4%.

6. An object according to claim 5 in which the magnesium content lies between 1 and 3%.

7. An object according to claim 5 in which the AlMg alloy is in the half-hard condition.

8. In a thermal transfer printing process for coloring a shaped article of aluminum or aluminum alloys, the step of coloring said article by a thermal transfer printing method, wherein said article has an oxide layer produced by anodic oxidation wherein the oxide layer is 5 to 25 μm thick, exhibits a crack-free elongation of at least 0.65 parts per thousand in the non-sealed condition and the ratio of the crack-free elongation of the oxide in the non-sealed condition to the crack-free elongation in the colored and non-sealed condition lies between 1:1.2 and 1:5.5.

9. The process according to claim 8 in which the thickness of the oxide layer is 10 to 22 μm.

10. The process according to claim 8 in which the crack-free elongation of the oxide layer in the newly produced, non-sealed condition lies between 0.7 and 4 parts per thousand.

11. The process according to claim 8 in which the ratio of the crack-free elongation of the oxide layer in the non-colored, non-sealed condition to that of the colored, non-sealed condition lies between 1:1.7 and 1:5.

12. The process according to claim 8 in which the oxide layer was produced on an AlMg alloy in which the magnesium content of the alloy lies between 0.5 and 4%.

13. The process according to claim 12 in which the magnesium content lies between 1 and 3%.

14. The process according to claim 12 in which the AlMg alloy is in the half-hard condition.

* * * * *